US009016962B1

(12) United States Patent
Yamamoto

(10) Patent No.: US 9,016,962 B1
(45) Date of Patent: Apr. 28, 2015

(54) COVER AND IMAGING APPARATUS

(71) Applicant: Panasonic Intellectual Property Management Co., Ltd., Osaka (JP)

(72) Inventor: Sei Yamamoto, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/324,556

(22) Filed: Jul. 7, 2014

(51) Int. Cl.
*G03B 17/00* (2006.01)
*G08B 13/196* (2006.01)

(52) U.S. Cl.
CPC ................................ *G08B 13/19619* (2013.01)

(58) Field of Classification Search
USPC .......................................... 396/427; 359/824
See application file for complete search history.

(56) References Cited

U.S. PATENT DOCUMENTS

2005/0259985 A1 * 11/2005 Mulvey et al. ................ 396/427
2006/0024046 A1 * 2/2006 Jones et al. .................. 396/427
2012/0243861 A1 9/2012 Svensson et al.

FOREIGN PATENT DOCUMENTS

EP 2503523 9/2012

* cited by examiner

*Primary Examiner* — W B Perkey
(74) *Attorney, Agent, or Firm* — Greenblum & Bernstein, P.L.C.

(57) ABSTRACT

A cover surrounds an imaging apparatus of capturing an image. The cover includes a first section that forms a part of the cover and includes a first joint end, a second section that forms a part of the cover and includes a second joint end, and a joint that is provided between the first joint end of the first section and the second joint end of the second section. An incidence angle of light which is adapted to be incident to the joint from the imaging apparatus is smaller than a predetermined angle which does not cause total reflection.

11 Claims, 9 Drawing Sheets

COVER AND IMAGING APPARATUS

BACKGROUND

1. Field of the Invention

The present invention relates to a cover and an imaging apparatus.

2. Description of the Related Art

Surveillance camera devices are generally used to monitor specific areas such as banks, stores or public places. The surveillance camera device is often arranged for rotation and/or tilting in order to enable image acquisition from different positions in the specific area.

In addition, for example, a surveillance camera device is known in which a circumference thereof is surrounded by a dome cover. For a dome cover of the related art, a dome cover is known which is formed by joining two covers to each other in order to set a viewing range of a surveillance camera to 180 degrees or more. See EP 2503523 A1, for example.

SUMMARY

In the surveillance camera device of the related art, image quality of a captured image may deteriorate in a joined part due to the two covers being joined to each other.

An aspect of the present invention provides a cover and an imaging apparatus capable of minimizing deterioration in image quality of a captured image.

According to some aspects of the present invention, it is possible to minimize deterioration in image quality of a captured image.

DETAILED DESCRIPTION

Hereinafter, an embodiment of the present invention will be described with reference to the drawings.

In the present embodiment, an "optical axis" indicates a central axis of a camera lens. In addition, "imaging light beams" described later indicate individual light beams which are collected by the camera lens in an imaging range. The imaging range is formed by a set of imaging light beams. A direction in which the optical axis extends is also referred to as an optical axis direction. A direction in which the imaging light beam extends is also referred to as an imaging light beam direction.

In addition, although light from outside inherently enters the camera lens and thus light from the camera lens is not incident to a cover which covers a surveillance camera device, the light from the camera lens may be incident to the cover. In other words, since a traveling direction of light also optically passes through the same light path in an opposite direction, in the present embodiment, a description will be made that light travels from the camera lens of the surveillance camera device to the cover which covers the surveillance camera device.

Figure 1:
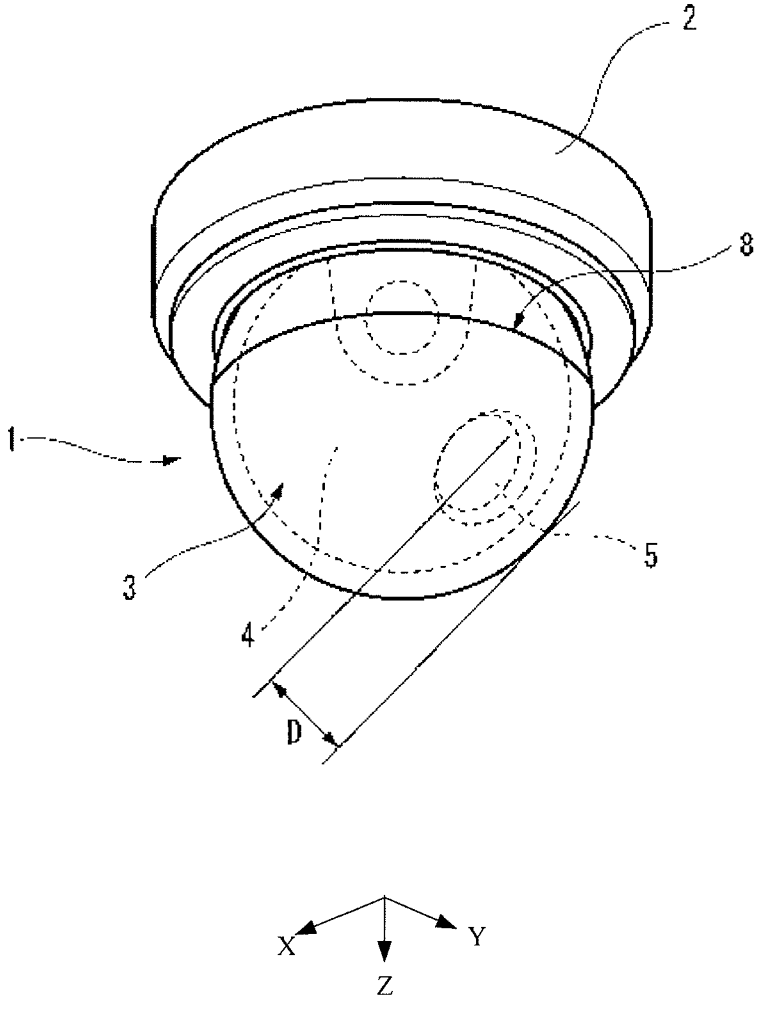
FIG. 1 is a perspective view showing a configuration example of a surveillance camera device according to an embodiment.

FIG. 1 illustrates a surveillance camera device 1 in an embodiment. The surveillance camera device 1 is an example of an imaging apparatus.

The surveillance camera device 1 includes a base 2 supporting a dome window 3 and a lens arrangement 4 (indicated with dashed lines) which is movable by tilting and/or rotation inside the dome window 3. The lens arrangement 4 includes, for example, a camera lens and a lens holder. Additional parts or components of the surveillance camera device 1 will not be described since they are not needed in order to describe the present embodiment.

An angle of view of the surveillance camera device 1 is, for example, 180° or more. The angle of view of 180° or more indicates that, for example, in a case where the surveillance camera device is provided on a ceiling, and an optical axis direction serving as a reference is perpendicular to a ceiling surface, a horizontal direction along the ceiling surface is included in an imaging range.

The surveillance camera device 1 includes, for example, an omni-directional camera or a PTZ camera. The PTZ camera is a camera which performs PTZ operations. The PTZ operations include at least one of a panning operation (P), a tilting operation (T), and a zooming operation (Z).

A front lens surface 5 of the lens arrangement 4 is arranged at a distance D from an inside surface of a hemispherical part of the dome window 3, and this distance D is constant during tilting or rotation of the lens arrangement 4. The distance D may be preferably in the range of 1 mm to 20 mm and more preferably in the range of 4 mm to 10 mm. An influence of a joint 8 on image quality can be minimized in a case where the distance D is maintained to as small a value as possible.

By the term "dome window" is meant an enclosure or cover arranged to partly enclose the lens arrangement of the surveillance camera device. The dome window is an example of a cover surrounding the lens arrangement 4.

The dome window 3 is transparent at least when viewing is performed in an outward direction.

As a non-limiting example, the dome window 3 may be made of a plastic material such as polymethylmethacrylate (PMMA) or polycarbonate (PC) and have a uniform wall thickness in the range of 1 mm to 2 mm.

In addition, as a non-limiting example, the dome window 3 may be made of a translucent material, or a material which has an opaque exterior and transmits only specific light therethrough, for example, a material which does not transmit visible light and transmits infrared light or ultraviolet light therethrough.

The dome window 3 may be manufactured by injection molding in order to ensure such uniform wall thickness.

Figure 2:
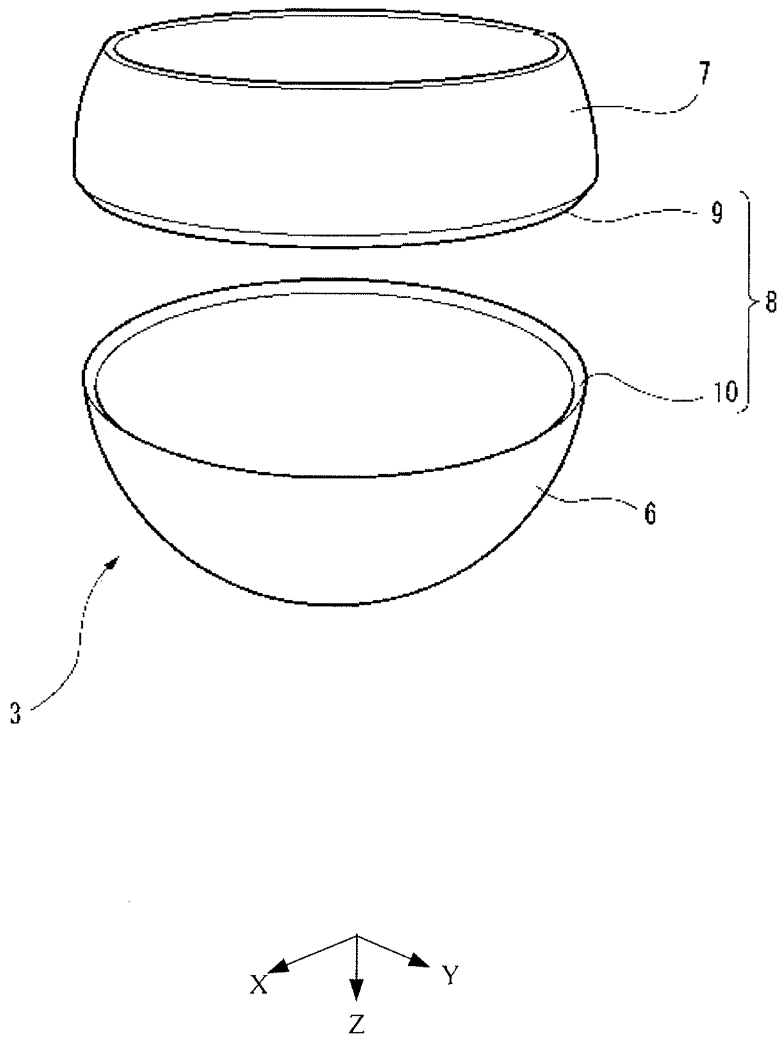
FIG. 2 is an exploded perspective view showing a configuration example of a dome window according to the embodiment.

FIG. 2 is an exploded perspective view showing a configuration example of the dome window 3.

The dome window 3 includes a first section 6 and a second section 7. In FIG. 2, the first section 6 is hemispherical, and the second section 7 has the shape of a spherical segment. The first section 6 and the second section 7 thus form parts of a common spherical shape.

The first section 6 is joined to the second section 7 along the joint 8 in which a joint end 10 of the first section 6 is attached to a joint end 9 of the second section 7. Since an outer surface and an inner surface of the joint 8 have a horizontal or latitudinal orientation (X-Y plane), and as the first section 6 is hemispherical and the second section 7 has the shape of a spherical segment, the joint ends 9 and 10 are annular, and thus the joint 8 is also annular.

The joint ends 9 and 10 are not parallel to an imaging light beam direction of the surveillance camera device 1 even in a case where the joint 8 is included in an imaging range of the surveillance camera device 1, and are inclined with a predetermined angle with respect to an imaging light beam of the surveillance camera device 1. Details of inclination of the joint ends 9 and 10 in the joint 8 will be described later.

In order to minimize an influence of the joint 8 on image quality, the distance D between the front lens surface 5 of the lens arrangement 4 and the joint 8, that is, an inner surface of the dome window 3 is required to be maintained to as small a value as possible. Actually, the distance D may be preferably, for example, in the range of 1 mm to 20 mm, and may be more preferably, for example, in the range of 4 mm to 10 mm. As described above, the distance D can be maintained to be constant or to be substantially constant with respect to the spherical part of the dome window 3 during tilting and/or rotation of the lens arrangement 4.

Further, unlike the shape of the dome window 3 shown in FIG. 2, the second section 7 of the dome window 3 may be given a shape different from the shape of a sphere segment, such as a flange for installation at the base 2. For example, the second section 7 may be given a cylindrical shape or a truncated cone shape. An influence due to optical effects is exerted on image quality when the lens arrangement 4 is viewing outward through both the first section 6 and the second section 7 of the dome window 3, but negative influences due to total reflection in the joint 8 described later are eliminated or at least significantly reduced by giving inclinations to the joint ends 9 and 10 of the joint 8.

Figure 3A:
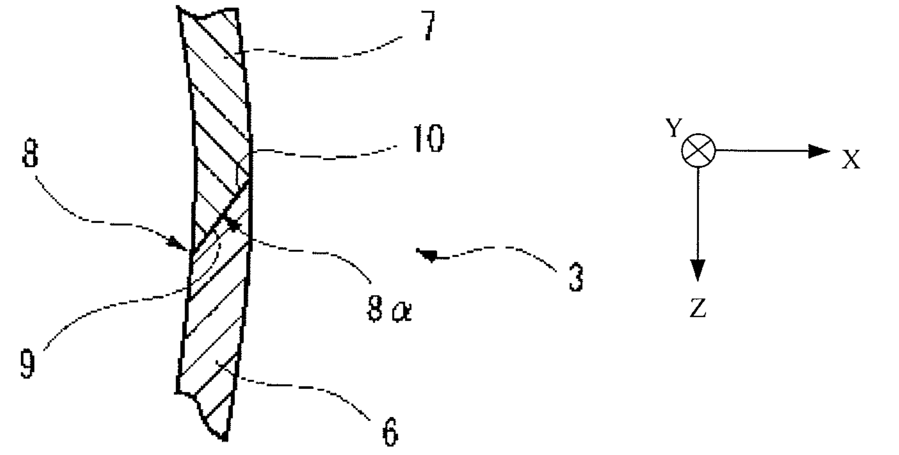
FIG. 3A is a partial cross-sectional view showing a first shape example of joint ends of the dome window according to the embodiment.
Figure 3B:
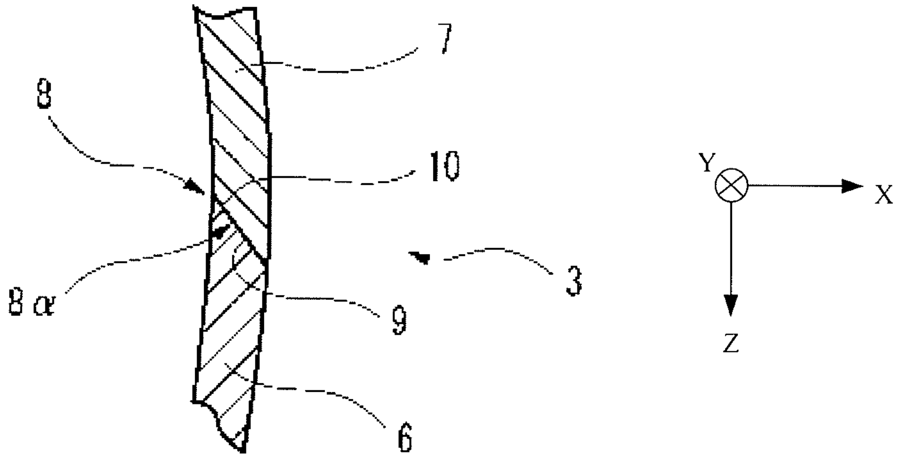
FIG. 3B is a partial cross-sectional view showing a second shape example of joint ends of the dome window according to the embodiment.

In the dome window 3 shown in FIG. 2, the joint ends 9 and 10 of the first section 6 and the second section 7 have a cross-section profile **8*a* which is inclined with a predetermined angle with respect to a radial direction (X-Y plane), and the cross-section profile 8*a* is shown in FIGS. 3A and 3B. FIGS. 3A and 3B are cross-sectional views showing a part of the dome window 3 including the joint 8. The cross-section profile 8*a* where the joint ends 9 and 10 of the first section 6 and the second section 7 are flush with each other can obliquely extend without a turnover, for example, as shown in each of FIGS. 3A and 3B. The term "no turnover" indicates that there is no part where an angle θx, described later, formed between the cross-section profile and an imaging light beam direction of the surveillance camera device 1 is equal to or less than an angle corresponding to a critical angle θm. Therefore, the cross-section profile 8*a* is not formed, for example, in a V shape or a U shape. The cross-section profile 8*a* corresponds to a joint cross-section 8A or 8**B described later.

Figure 4:
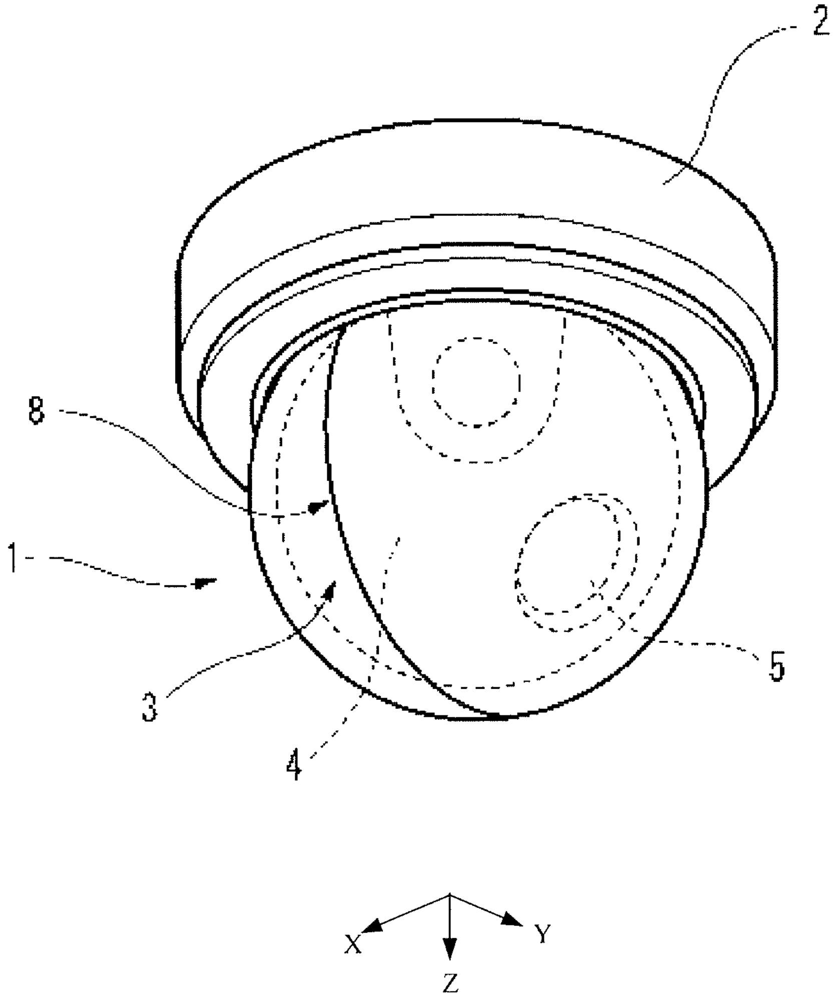
FIG. 4 is a perspective view showing a modification example of the surveillance camera device according to the embodiment.

In the present embodiment, as shown in FIG. 1, the outer surface and the inner surface of the joint 8 have a horizontal orientation or a latitudinal orientation (X-Y plane). It is understood that the joint 8 may have other orientations. For example, other orientations of the joint 8 may be a vertical orientation or a longitudinal orientation (Z-axis orientation) shown in FIG. 4. In a case where the dome window 3 has, for example, a shape corresponding to the shape shown in FIG. 2, this results in the first section 6 and the second section 7 being mirror images of each other.

Next, a joint cross-section of the first section 6 and the second section 7 of the dome window 3 will be described. The joint cross-section corresponds to the cross-section profile **8*a* where the above-described joint ends 9 and 10 are flush with each other (refer to FIGS. 3A and 3B). The joint cross-section is a contact surface in which the joint end 9 of the first section 6 is in contact with the joint end 10 of the second section 7**.

Figure 5:
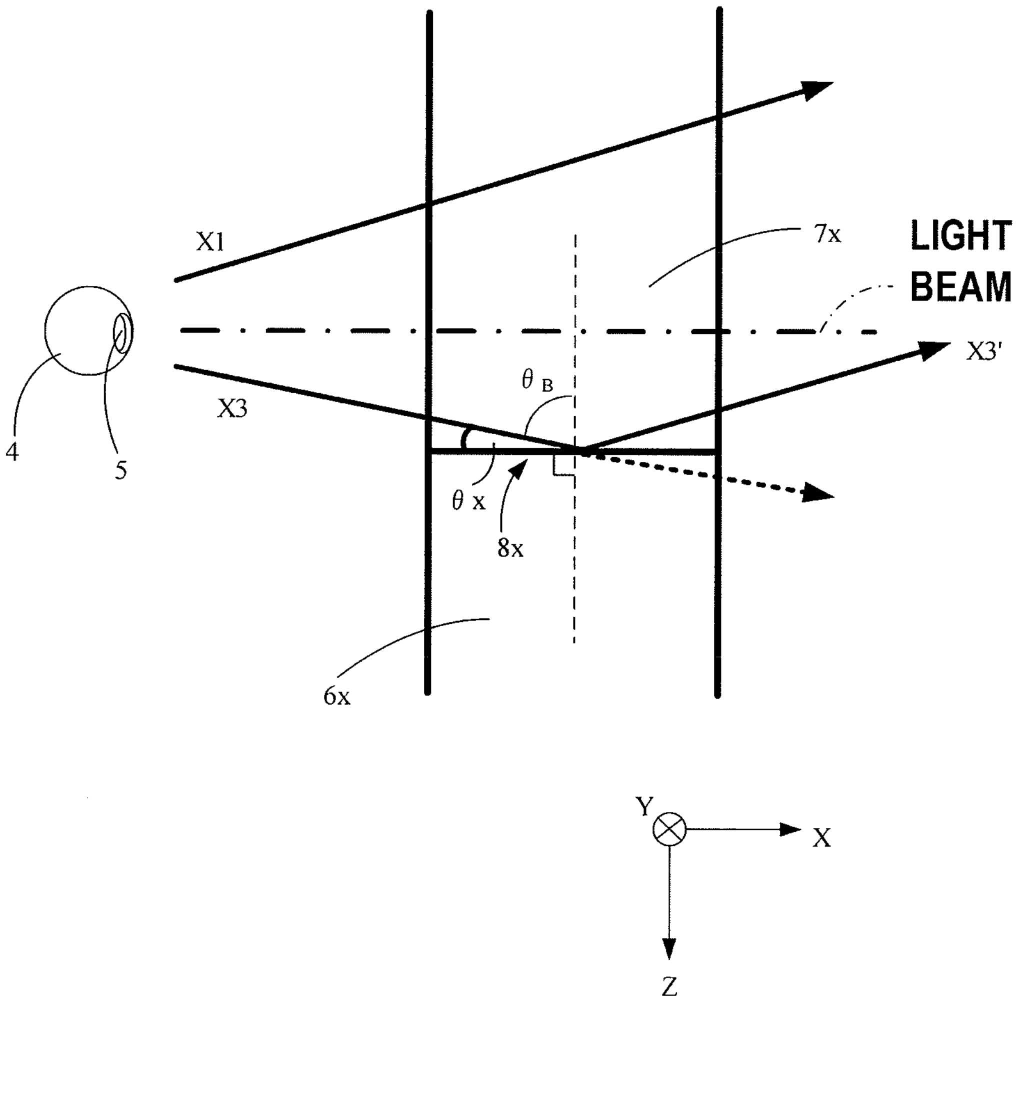
FIG. 5 is a partial cross-sectional view showing a joint cross-section of a first section and a second section in the related art.

FIG. 5 is a partial cross-sectional view showing a joint cross-section **8*x* of a first section 6*x* and a second section 7*x* of the related art. In FIG. 5, a direction in which the joint cross-section 8*x* extends (here, an X axis direction) is substantially parallel to an optical axis direction of the surveillance camera device 1. Here, a material of an adhesive which adheres the first section 6*x* to the second section 7*x* is different from a material of the first section 6*x* or the second section 7*x*. Therefore, the adhesive and the first section 6*x* or the second section 7*x*** have different refractive indexes.

On the other hand, a material of the first section **6*x* is the same as a material of the second section 7*x*. Therefore, the first section 6*x* and the second section 7*x*** have the same refractive index.

The adhesive is coated on at least one of the first section **6*x* and the second section 7*x*, and adheres the first section 6*x* and the second section 7*x* to each other at the joint cross-section 8*x*. The adhesive is, for example, a light curable resin which is light-transmissive, and a refractive index of the light curable resin is, for example, 1.430. In addition, the first section 6*x* and the second section 7*x*** may be welded to each other by using ultrasonic waves.

In a case where an angle θx of any imaging light beam direction X3 of the surveillance camera device 1 relative to the joint cross-section **8*x* is equal to or less than a predetermined angle, light incident to the joint 8 may be totally reflected. If the total reflection occurs, a desired image is not formed, and quality of an image captured by the surveillance camera device 1 deteriorates. In FIG. 5, it can be understood that an imaging light beam is totally reflected in a case of the imaging light beam direction X3, and the totally reflected imaging light beam travels in a direction X3'. In FIG. 5, a range between X1 and X3 exemplifies an imaging range of the surveillance camera device 1**, and any imaging light beam is included in the imaging range.

Generally, in the total reflection of light, a critical angle θm is expressed as in the following (Equation 1) by Snell's law.

$$\sin\theta m = n_A/n_B \quad \text{(Equation 1)}$$

Here, $n_A$ indicates a refractive index (absolute refractive index) of a medium A, and $n_B$ indicates a refractive index of a medium B. In addition, it is assumed that $n_B > n_A$ is satisfied, and light travels from the medium B to the medium A. When an incidence angle from the medium B to the medium A is $\theta_B$, $\theta_B$>θm is satisfied if total reflection occurs.

For example, it is assumed that the medium B is PMMA for forming the first section 6*x* and the second section 7*x*, and the medium A is a material for forming the adhesive. A refractive index of the medium B is greater than a refractive index of the medium A, and, in this case, the refractive index of the medium B is 1.585, and the refractive index of the medium A is 1.430. In this case, when light is incident to the adhesive from the first section 6*x* or the second section 7*x*, sin θm is 1.430/1.5852≈65° from (Equation 1). In other words, θm is about 65. Therefore, in this example, if an incidence angle $\theta_B$>65°, total reflection occurs. The incidence angle $\theta_B$>65° is the same as an angle θx≤25°.

In addition, the dome window 3 may be made of materials (for example, a UV curable resin) other than PMMA or PC. A refractive index of the UV curable resin is about 1.5.

Figure 6:
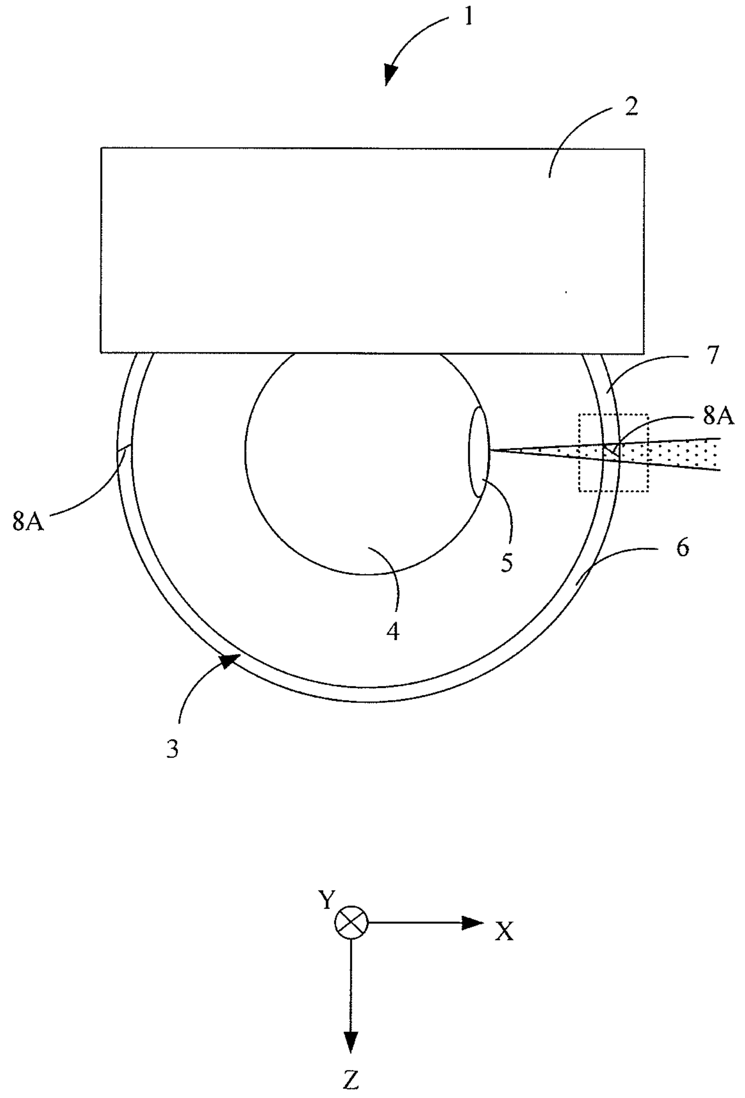
FIG. 6 is a cross-sectional view showing a configuration example of the surveillance camera device including a joint cross-section of the first section and the second section in the embodiment.

FIG. 6 is a cross-sectional view showing a configuration example of the surveillance camera device 1 including the joint cross-section 8A of the first section 6 and the second section 7 in the present embodiment. As shown in FIG. 6, an imaging light beam direction of the surveillance camera device 1 and the joint cross-section 8A are not substantially parallel to each other, and form a predetermined angle or more which does not cause total reflection in the above Snell's law.

In FIG. 6, a material of an adhesive for adhering the first section 6 to the second section 7 is different from a material of the first section 6 or the second section 7. Therefore, the adhesive and the first section 6 or the second section 7 have different refractive indexes.

On the other hand, materials of the first section 6 and the second section 7 are the same as each other. Therefore, the first section 6 and the second section 7 have the same refractive index. In addition, the first section 6 and the second section 7 may be made of different materials, and may have different refractive indexes.

The adhesive is coated on at least one of the first section 6 and the second section 7, and adheres the first section 6 and the second section 7 to each other at the joint cross-section 8A. Therefore, the adhesive extends substantially in parallel to the joint cross-section 8A. In addition, the adhesive is, for example, a light curable resin which is light-transmissive, and a refractive index of the light curable resin is, for example, 1.430. In addition, the first section 6 and the second section 7 may be welded to each other by using ultrasonic waves.

In FIG. 6, the medium A is a light-transmissive material for forming the adhesive, and the medium B is PMMA for forming the first section 6 and the second section 7.

Figure 7A:
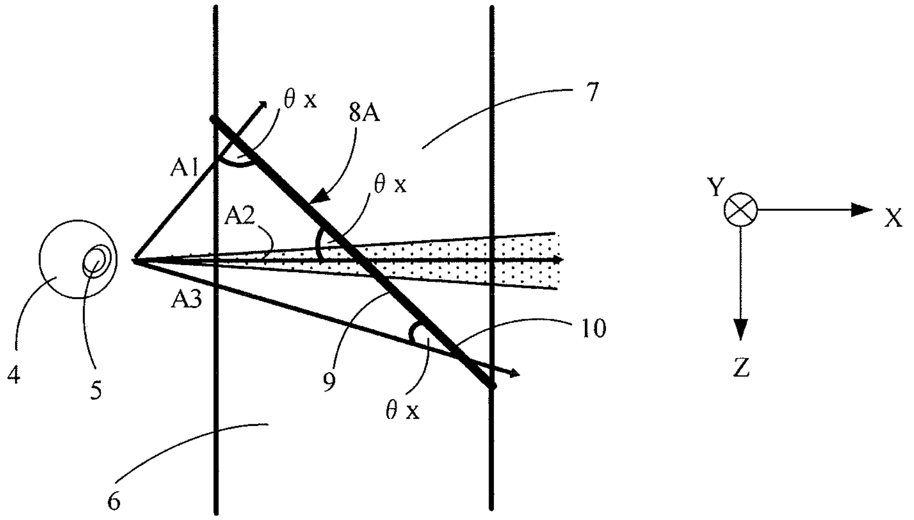
FIG. 7A is a partial cross-sectional view showing a first enlargement example of surroundings of the joint cross-section of FIG. 6.

FIG. 7A is a partial cross-sectional view showing an example of the joint cross-section 8A of the first section 6 and the second section 7 of the present embodiment. FIG. 7A shows an example in which the surroundings of the joint cross-section surrounded by the dotted lines in FIG. 6 are enlarged.

In FIG. 7A, angles θx formed between a direction in which the joint cross-section 8A extends and imaging light beam directions A1 to A3 of the surveillance camera device 1 are greater than an angle corresponding to the critical angle θm shown in FIG. 5. In other words, the joint ends 9 and 10 are tapered surfaces, and thus the joint cross-section 8A is inclined with respect to the X axis. In this case, since the angles θx formed between the imaging light beam directions A1 to A3 of the surveillance camera device 1 and the joint cross-section 8A are equal to or greater than a predetermined angle, and thus the incidence angle $\theta_B$ is smaller than the critical angle θm, total reflection does not occur in the adhesive. It can be said that light collected on an image forming surface of the camera lens of the surveillance camera device 1 has not been totally reflected in the joint cross-section 8A.

Therefore, even in a case where light is incident to the joint cross-section 8A, a desired image can be formed, and thus it is possible to minimize deterioration in quality of an image captured by the surveillance camera device 1. Since the joint cross-section 8A is a tapered surface, positioning between the first section 6 and the second section 7 is easily performed, and thus coupling therebetween is facilitated. Since the joint cross-section 8A is a tapered surface, a strength is improved for a force which acts in a transverse direction (a direction along the X-Y plane), and thus it is possible to improve a strength of the dome window 3.

In FIG. 7A, the joint ends 9 and 10 have the joint cross-section 8A which is inclined upwardly toward the inside (the surveillance camera device 1 side) of the dome window 3 surrounded by the dome window 3, but a reversely inclined joint cross-section 8B may be used. Also in this case, in the same manner as in FIG. 7A, an adhesive extends substantially in parallel to the joint cross-section 8B.

Figure 7B:
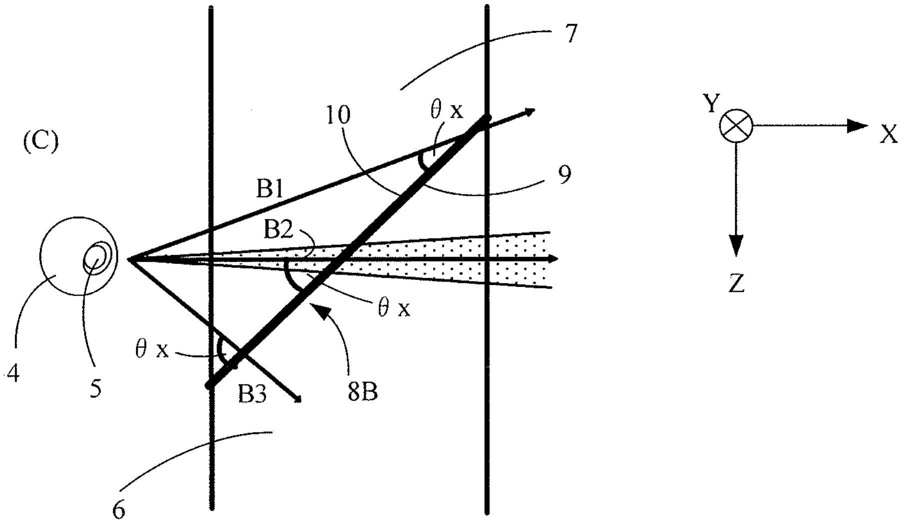
FIG. 7B is a partial cross-sectional view showing a second enlargement example of surroundings of the joint cross-section of FIG. 6.

In other words, as shown in FIG. 7B, the dome window 3 may have the joint cross-section 8B which is inclined downwardly (in the right Z axis direction) toward outside (an opposite side to the surveillance camera device 1) of the dome window 3. In this case, since angles θx formed between any imaging light beam directions B1 to B3 of the surveillance camera device 1 and the joint cross-section 8B are all equal to or greater than a predetermined angle, and thus the incidence angle $\theta_B$ is smaller than the critical angle θm, total reflection does not occur in the adhesive. Therefore, it is possible to minimize deterioration in image quality of a captured image, to easily perform positioning between the first section 6 and the second section 7, and to improve an intensity of the dome window 3.

In addition, the joint cross-sections 8A and 8B are shown to be a straight line in the cross-sectional views in FIGS. 7A and 7B, but may not be a straight line. For example, the joint cross-sections 8A and 8B may have no turnover such as in a U shape or a V shape in an imaging range of the surveillance camera device 1. This is because, if there is a turnover, a position satisfying the condition of total reflection is present among all positions of the joint cross-sections 8A and 8B at the joint ends 9 and 10. Since there is no turnover at the joint ends 9 and 10, it is possible to minimize deterioration in image quality of a captured image.

Next, a position of the joint 8 in the dome window 3 will be described.

Figure 8A:
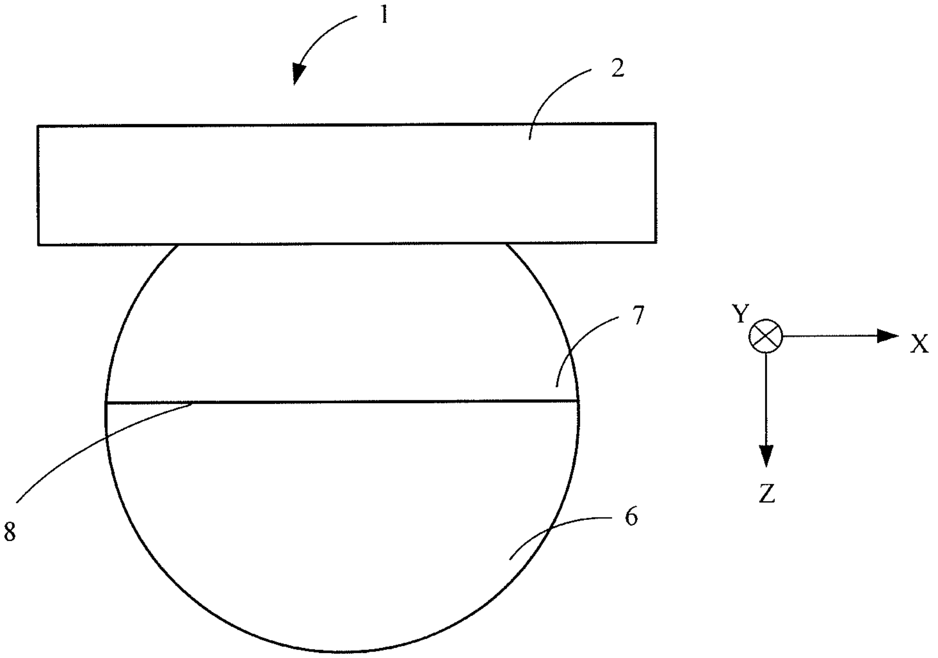
FIG. 8A is a cross-sectional view showing a first example of a position of the joint of the dome window in the surveillance camera device according to the embodiment.
Figure 8B:
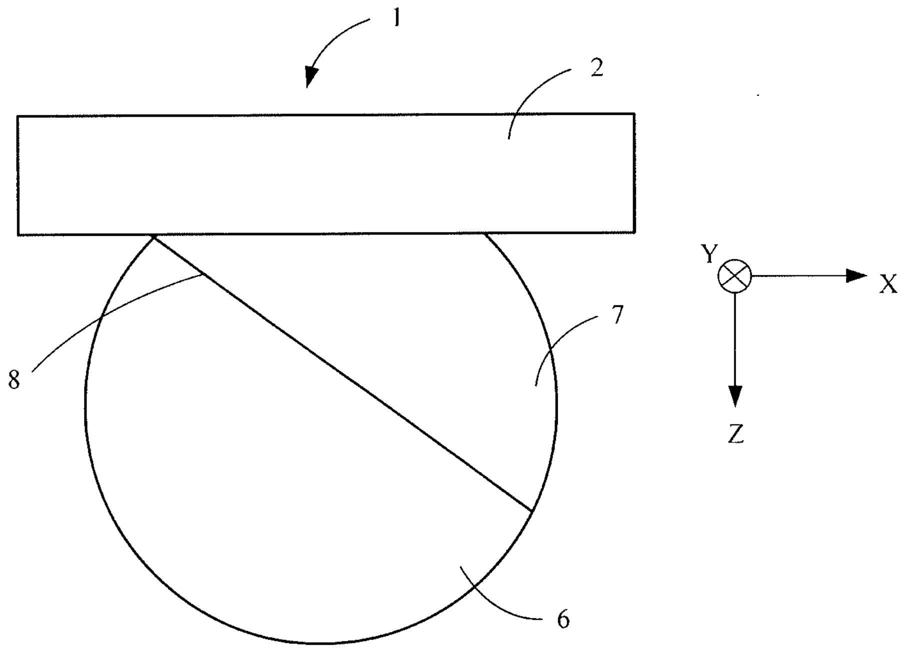
FIG. 8B is a cross-sectional view showing a second example of a position of the joint of the dome window in the surveillance camera device according to the embodiment.
Figure 9:
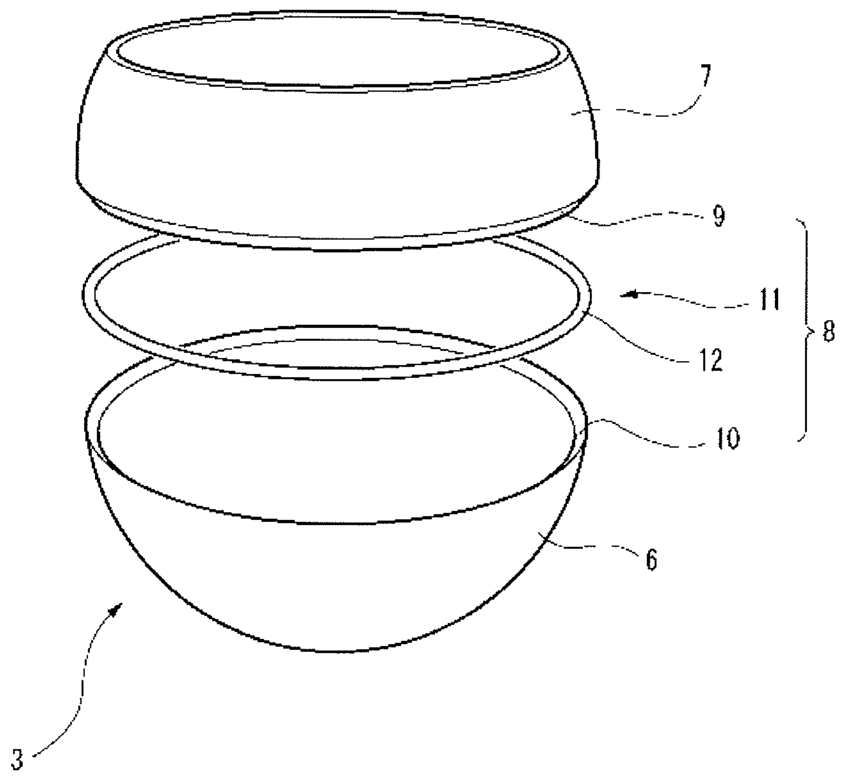
FIG. 9 is an exploded perspective view illustrating a configuration example of the dome window using a light absorber in the embodiment.

FIG. 8A is a cross-sectional view showing a first example of a position of the joint 8 of the dome window 3 in the surveillance camera device 1. FIG. 8B is a cross-sectional view showing a second example of a position of the joint 8 of the dome window 3 in the surveillance camera device 1.

In FIG. 8A, the joint 8 is arranged along the X-Y plane. Also in this case, since the joint cross-sections 8A and 8B are formed so as to have a tapered surface, an angle between an imaging light beam direction and each of the joint cross-sections 8A and 8B is increased so as to allow total reflection to be avoided, and thus it is possible to minimize deterioration in image quality of a captured image.

In FIG. 8B, the first section 6 and the second section 7 are joined to each other with a predetermined angle with respect to the X-Y plane, and, for example, one end side of the joint 8 is in contact with the base 2. In this case, even without consideration of the joint cross-sections 8A and 8B, a position of the joint 8 relative to the surveillance camera device 1 is inclined with a predetermined angle with respect to the imaging light beam direction of the surveillance camera device 1. For this reason, the joint cross-sections 8A and 8B may not have the tapered surface, or an inclination angle of each of the joint cross-sections 8A and 8B with respect to the imaging light beam direction of the surveillance camera device 1 may be made small. Also in this case, total reflection of light incident to the joint 8 is prevented, and thus it is possible to minimize deterioration in image quality of a captured image. In addition, one end side of the joint 8 may not be in contact with the base 2. In this case, for example, one end side of the joint 8 is located in a range which is not included in an imaging range of the surveillance camera device 1, or one end side of the joint 8 has an angle which does not cause total reflection even when included in the imaging range.

As mentioned above, since the dome window 3 has the joint cross-sections 8A and 8B which are tapered surfaces without a turnover at the joint ends 9 and 10, light which has been totally reflected in the adhesive located at the joint cross-sections 8A and 8B does not form an image in the camera lens of the surveillance camera device 1. In other words, light which forms an image in the camera lens of the surveillance camera device 1 includes light which is slightly deflected in the adhesive of the joint cross-sections 8A and 8B, but does not include totally reflected light. Therefore, it is possible to minimize deterioration in quality of an image captured by the surveillance camera device 1.

In addition, a configuration example and an arrangement example of the surveillance camera device 1 according to the embodiment will be described in a supplementary manner.

The surveillance camera device 1 may include a shutter which stores or exposes the lens arrangement 4. In this case, the dome window 3 surrounds the shutter. Therefore, even in a case where the shutter is opened, the lens arrangement 4 is surrounded by the base 2 and the dome window 3. Since the dome window 3 is provided, the surveillance camera device 1 has excellent, for example, water resistance, dust resistance, and light resistance. In addition, an influence of the dome window 3 on a captured image is not more than a predetermined level, and sufficient security can be ensured through analysis of a captured image.

The surveillance camera device 1 is installed, for example, in various facilities, in predetermined rooms of various facilities, or on walls or ceilings in predetermined areas of predetermined rooms of various facilities. The predetermined areas include a predetermined privacy sensing area in which both ensuring security and privacy protection are necessary.

The surveillance camera device 1 operates as, for example, a network camera which images a subject located in a predetermined area. The surveillance camera device 1 may operate, for example, in cooperation with a surveillance server in a surveillance center. In addition, there may be a configuration of a surveillance system which includes a plurality of surveillance camera devices 1 and surveillance servers.

In a camera system of the related art, a joint cross-section of the joint ends of the first section and the second section of the dome window is formed in an imaging light beam direction of the surveillance camera device, and thus light may be totally reflected in the joint cross-section. For this case, image quality of a captured image may deteriorate.

According to the surveillance camera device 1 of the present embodiment, when compared with a surveillance camera device of the related art, for example, the dome window 3 includes the joint cross-sections 8A and 8B having a predetermined inclination with respect to an imaging light beam direction of the surveillance camera device. Therefore, even when an adhesive is present in the joint cross-sections 8A and 8B, it is possible to prevent total reflection of light and thus to minimize deterioration in image quality of a captured image.

In addition, in a case where an imaging light beam direction of the surveillance camera device 1 such as a PTZ camera is changed, the joint cross-sections 8A and 8B may not have a predetermined inclination with respect to the imaging light beam direction of the surveillance camera device 1 at all times.

For example, in a case where an imaging range of the surveillance camera device 1 is changed by PTZ operations, and thus the entire joint 8 is not included in the imaging range, the joint cross-sections may not have a predetermined inclination with respect to an imaging light beam direction of the surveillance camera device 1 which has the changed imaging range. In other words, an angle $\theta x$ of each of the joint cross-sections 8A and 8B with respect to an imaging light beam direction may be equal to or less than an angle corresponding to the critical angle $\theta m$. On the other hand, in a case where an imaging range of the surveillance camera device 1 is changed by PTZ operations, and thus at least a part of the joint 8 is included in the imaging range, the joint cross-sections 8A and 8B have a predetermined inclination with respect to an imaging light beam direction of the surveillance camera device 1 which has the changed imaging range. In other words, an angle $\theta x$ of each of the joint cross-sections 8A and 8B with respect to an imaging light beam direction is greater than an angle corresponding to the critical angle $\theta m$. Accordingly, a degree of freedom of a shape of each of the joint cross-sections 8A and 8B in the dome window 3 is increased as compared with a case where a predetermined inclination is normally formed with respect to an imaging right direction of the surveillance camera device 1.

In addition, the present invention is not limited to the configuration according to the embodiment, and is applicable to any configuration which can achieve functions of the configuration of the present embodiment.

In addition, in the above-described embodiment, a window covering the surveillance camera device 1 may not have a dome shape, and may have, for example, a tubular shape (for example, a cylindrical shape or a polygonal shape). Further, the dome window 3 may not cover the entire circumference of the lens arrangement 4 along with the base 2. For example, an opening may be present at a part of the dome window 3. Also in this case, the joint cross-sections 8A and 8B have a predetermined inclination, and thus it is possible to minimize deterioration in image quality of a captured image.

In addition, in the embodiment, as an example, the medium B is a material for forming the first section 6 or the second section 7, and the medium A is a material for forming the adhesive. The present invention is not limited thereto, and the medium A may be a material for forming the first section 6 or the second section 7, and the medium B may be a material for forming the adhesive. In other words, the present embodiment is also applicable to a case where a refractive index of the adhesive is greater than a refractive index of the first section 6 or the second section 7. In this case, an incidence angle of light which is incident to the first section 6 or the second section 7 from the joint 8 is smaller than a predetermined angle which does not cause total reflection.

SUMMARY OF ASPECTS OF THE PRESENT INVENTION

According to an aspect of the present invention, there is provided a cover for surrounding an imaging apparatus of capturing an image, the cover including a first section that forms a part of the cover and includes a first joint end; a second section that forms a part of the cover and includes a second joint end; a joint that is provided between the first joint end of the first section and the second joint end of the second section, in which an incidence angle of light which is adapted to be incident to the joint from the imaging apparatus is smaller than a predetermined angle which does not cause total reflection.

According to the configuration, the light incident to the joint does not perform total reflection. Therefore, an image is suitably formed in an imaging range of a surveillance camera, and thus a captured image is obtained. Thus, even when the cover can be divided into a plurality of members, it is possible to minimize deterioration in image quality of a captured image.

The cover according to the aspect of the present invention may be configured so that, $\theta_B$ is smaller than θm which satisfies sin $\theta m = n_A/n_B$, where a refractive index of the first section or the second section is $n_B$, a refractive index of the joint is $n_A$, an incidence angle of light which travels from the first section or the second section to the joint is $\theta_B$, and a critical angle is θm.

According to the configuration, an incidence angle of the light which travels from the first section or the second section to the joint does not cause total reflection. Therefore, an image is suitably formed in an imaging range of a surveillance camera, and thus a captured image is obtained. Thus, even when the cover can be divided into a plurality of members, it is possible to minimize deterioration in image quality of a captured image.

The cover according to the aspect of the present invention may be configured so that the joint excludes a turnover in a portion which is included in an imaging range of the imaging apparatus.

According to the configuration, the light incident to the joint does not perform total reflection regardless of an incidence position at the joint. Therefore, an image is suitably formed in an imaging range of a surveillance camera, and thus a captured image is obtained. Thus, it is possible to minimize deterioration in image quality of a captured image.

The cover according to the aspect of the present invention may be configured so that the first section and the second section are made of a same material.

The cover according to the aspect of the present invention may be configured so that the joint is parallel or perpendicular to an installation surface of a base which supports the imaging apparatus.

The cover according to the aspect of the present invention may be configured so that the joint is not parallel to an installation surface of a base which supports the imaging apparatus.

The cover according to the aspect of the present invention may be configured so that a part of the joint is in contact with an installation surface of a base which supports the imaging apparatus.

According to the configuration, the joint has a predetermined inclination with respect to the installation surface of the base, and thus a predetermined inclination also occurs between the installation surface of the base and the joint cross-section. Therefore, as described above, the light incident to the joint cross-section does not perform total reflection, and an image is suitably formed in an imaging range of a surveillance camera, so that a captured image is obtained. Accordingly, not only in a case where the joint cross-section has an inclination, but also in a case where a position of the joint with respect to the installation surface of the base is inclined, it is possible to minimize deterioration in image quality of a captured image.

The cover according to the aspect of the present invention may be configured so that the first section and the second section are joined to each other at the joint so as to form a spherical segment.

The cover according to the aspect of the present invention may be configured so that the joint includes an adhesive that adheres the first joint end of the first section to the second joint end of the second section.

According to the configuration, properties of materials of the first section or the second section and the adhesive are different from each other, and thus refractive indexes thereof are different from each other. Also in this case, when light is incident to the adhesive from the first section or the second section, the light does not perform total reflection, and thus it is possible to minimize deterioration in image quality of a captured image.

The cover according to the aspect of the present invention may be configured so that the adhesive is light-transmissive.

According to the configuration, the first section and the second section can be adhered to each other, and light can be transmitted through an adhered part. Therefore, a captured image can be prevented from being divided in the adhered part, and thus it is possible to minimize deterioration in image quality of the captured image.

In addition, according to another aspect of the present invention, there is provided an imaging apparatus for capturing an image, the imaging apparatus including an imaging unit that acquires an image signal; a lens arrangement that includes an imaging lens which forms an image of a subject in the imaging unit; and a cover that surrounds the imaging apparatus, wherein the cover includes a first section that forms a part of the cover and includes a first joint end; a second section that forms a part of the cover and includes a second joint end; a joint that is provided between the first joint end of the first section and the second joint end of the second section, and in which an incidence angle of light which is incident to the joint from the imaging apparatus is smaller than a predetermined angle which does not cause total reflection.

According to the configuration, the light incident to the joint does not perform total reflection. Therefore, an image is suitably formed in an imaging range of a surveillance camera, and thus a captured image is obtained. Thus, even when the cover can be divided into a plurality of members, it is possible to minimize deterioration in image quality of a captured image.

The present invention can be useful for a cover, an imaging apparatus, and the like capable of minimizing deterioration in image quality of a captured image.

What is claimed is:

1. A cover for surrounding an imaging apparatus of capturing an image, the cover comprising:

a first section that forms a part of the cover and includes a first joint end;

a second section that forms a part of the cover and includes a second joint end; and a joint that is provided between the first joint end of the first section and the second joint end of the second section, wherein an incidence angle of light which is adapted to be incident to the joint from the imaging apparatus is smaller than a predetermined angle which does not cause total reflection.

2. The cover according to claim 1, wherein $\theta_B$ is smaller than θm which satisfies sin $\theta m = n_A/n_B$, where a refractive index of the first section or the second section is $n_B$, a refractive index of the joint is $n_A$, an incidence angle of light which travels from the first section or the second section to the joint is $\theta_B$, and a critical angle is $\theta m$.

3. The cover according to claim 1, wherein the joint excludes a turnover in a portion which is included in an imaging range of the imaging apparatus.

4. The cover according to claim 1, wherein the first section and the second section are made of a same material.

5. The cover according to claim 1, wherein the joint is parallel or perpendicular to an installation surface of a base which supports the imaging apparatus.

6. The cover according to claim 1, wherein the joint is not parallel to an installation surface of a base which supports the imaging apparatus.

7. The cover according to claim 6, wherein a part of the joint is in contact with the installation surface of the base.

8. The cover according to claim 1, wherein the first section and the second section are joined to each other at the joint so as to form a spherical segment.

9. The cover according to claim 1, wherein the joint includes an adhesive that adheres the first joint end of the first section to the second joint end of the second section.

10. The cover according to claim 1, wherein the adhesive is light-transmissive.

11. An imaging apparatus for capturing an image, the imaging apparatus comprising:

an imaging unit that acquires an image signal;

a lens arrangement that includes an imaging lens which forms an image of a subject in the imaging unit; and a cover that surrounds the imaging apparatus, wherein the cover includes a first section that forms a part of the cover and includes a first joint end;

a second section that forms a part of the cover and includes a second joint end; and a joint that is provided between the first joint end of the first section and the second joint end of the second section, wherein an incidence angle of light which is incident to the joint from the imaging apparatus is smaller than a predetermined angle which does not cause total reflection.

* * * * *